US012655923B1

(12) United States Patent
    Hsu

(10) Patent No.: US 12,655,923 B1
(45) Date of Patent: Jun. 16, 2026

(54) FLUID COUPLER

(71) Applicant: FOSITEK CORPORATION, New Taipei City (TW)

(72) Inventor: An-Szu Hsu, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/079,918

(22) Filed: Mar. 14, 2025

(30) Foreign Application Priority Data

Feb. 18, 2025 (TW) ................................. 114105939

(51) Int. Cl.
    *F16L 37/086* (2006.01)
    *F16L 37/373* (2006.01)

(52) U.S. Cl.
    CPC ........... *F16L 37/086* (2013.01); *F16L 37/373* (2013.01); *Y10T 137/87965* (2015.04); *Y10T 137/87973* (2015.04)

(58) Field of Classification Search
    CPC ..... Y10T 137/87965; Y10T 137/87973; F16L 37/086; F16L 37/373; F16L 37/407
    USPC ........................................ 137/614.05, 614.06
    See application file for complete search history.

(56) References Cited

U.S. PATENT DOCUMENTS

| | | | | |
|---|---|---|---|---|
| 407,456 | A | * | 7/1889 | Williams .............. F16L 37/373 285/379 |
| 1,192,988 | A | * | 8/1916 | Chamberlain et al. ... F16K 3/08 137/359 |
| 2,872,216 | A | * | 2/1959 | Kaiser ..................... F16L 37/26 251/102 |
| 2,948,553 | A | * | 8/1960 | Gill ........................ F16L 37/373 137/614.02 |
| 3,159,180 | A | * | 12/1964 | Courtot ................. F16L 37/373 137/614.06 |
| 4,335,747 | A | * | 6/1982 | Mitsumoto ............. F16L 59/18 251/142 |

(Continued)

FOREIGN PATENT DOCUMENTS

| | | |
|---|---|---|
| CN | 118088811 A | 5/2024 |
| CN | 118935125 A | 11/2024 |
| TW | M670670 U | 5/2025 |

OTHER PUBLICATIONS

Search Report dated Oct. 28, 2025 issued by Taiwan Intellectual Property Office for counterpart application No. 114105939.

*Primary Examiner* — William M Mccalister
(74) *Attorney, Agent, or Firm* — Demian K. Jackson; Jackson IPG PLLC

(57) ABSTRACT

A fluid coupler includes a body with a docking platform, a support portion annularly disposed around the body's first end adjacent to the docking platform's rear side, a valve assembly, a switch member, and an interlocking mechanism. The support portion contains a limiting cavity and a latch pin hole, the limiting cavity communicating with a safety pin hole and the latch pin hole opening at the first mounting surface. The valve assembly has a valve ball with a passage, pivotally mounted in the body. The switch member, on the first mounting surface, includes a handle with a limiting groove and a latch tongue. The interlocking mechanism features a safety pin with an annular groove in the limiting cavity, a spring maintaining its position, and a latch pin matching the handle's limiting groove and the safety pin's annular groove for locking or unlocking the handle.

10 Claims, 10 Drawing Sheets

(56)                    References Cited

U.S. PATENT DOCUMENTS 4,351,351 A * 9/1982 Flory ................. F16L 55/1015
                                              251/149.7
4,438,779 A * 3/1984 Allread ................ F16L 37/113
                                              285/85
4,687,016 A * 8/1987 Takahashi ............ F16L 37/002
                                              137/240
5,090,449 A * 2/1992 Fournier .............. F16L 37/373
                                              137/637.05
5,099,883 A * 3/1992 Maiville .............. F16L 37/373
                                              285/87
5,332,001 A * 7/1994 Brown ................... F16L 37/36
                                              251/96
5,402,825 A * 4/1995 McCracken .......... F16L 37/373
                                              137/614.01
5,488,972 A * 2/1996 McCracken .......... F16L 37/373
                                              137/614.01
6,056,011 A * 5/2000 Bormioli ............. F16L 55/1007
                                              137/614.01

8,082,947 B2 * 12/2011 Chang ................... F16K 31/535
                                              251/249
8,132,781 B2 * 3/2012 Haunhorst ........... F16L 37/373
                                              251/149.9
8,434,735 B2 * 5/2013 Tausch ................. F16L 37/127
                                              285/317
8,814,137 B2 * 8/2014 Wong ..................... F16L 37/18
                                              251/149.9
8,967,177 B2 * 3/2015 Haunhorst ............. F16L 37/36
                                              137/614.01
11,692,643 B1 * 7/2023 Chen ...................... F16K 35/14
                                              137/383
11,867,333 B2 * 1/2024 Hamkens ............. F16L 37/373
11,879,581 B2 * 1/2024 Koller .................... F16L 37/36
2010/0269933 A1 * 10/2010 Haunhorst ............. F16L 37/36
                                              137/614.06
2012/0211107 A1 * 8/2012 Haunhorst ............. F16L 37/36
                                              137/614.06

* cited by examiner

FLUID COUPLER

This application claims the priority benefit of Taiwan patent application number 114105939 filed on Feb. 18, 2025, the disclosure of which is hereby incorporated by reference in its entirety.

FIELD OF THE INVENTION

The present invention relates to a fluid coupler, and more particularly, to a fluid coupler having a ball valve structure.

BACKGROUND OF THE INVENTION

A fluid coupler is used in fluid transport pipeline systems, primarily for the quick connection or disconnection of two pipeline segments while controlling the flow of fluid. In conventional technology, the design of fluid couplers typically emphasizes sealing performance and operational convenience. However, in practical applications, the following technical deficiencies and limitations remain. For instance, existing fluid couplers may experience unintended or improper operation, causing the valve to open before complete docking, thereby posing a risk of fluid leakage. To prevent such incidents, some fluid couplers incorporate manual locking mechanisms, but these mechanisms are cumbersome to operate and susceptible to user oversight, reducing overall system safety. Furthermore, conventional fluid couplers fail to address the issue of unintended separation when the valve is not closed. If the connector is inadvertently separated while the valve is in an open state, it may result in fluid leakage or equipment damage.

Please refer to FIG. 1A and FIG. 1B. FIG. 1A is a side view schematic of a conventional valve coupler, while FIG. 1B illustrates the interlocking system of the valve coupler shown in FIG. 1A. As depicted in FIGS. 1A and 1B, the prior art discloses a valve coupler equipped with mechanisms to prevent the valve from opening before proper docking and to prevent disconnection while the valve remains open. The mechanism for preventing the valve from opening before proper docking primarily relies on the coordinated operation of a gear portion 11, a pin 12, and a roller 14. Specifically, when the valve coupler is in an undocked state, the pin 12 is biased by a spring to extend outward, thereby locking the roller 14. The locked roller 14 restricts the movement of a key pin 18, further preventing the valve from rotating from a closed position to an open position. The gear portion 11 is disposed between a handle 6 and the pin 12, functioning to convert the rotational motion of the handle 6 into the linear movement of the pin 12. Additionally, the mechanism for preventing disconnection while the valve remains open similarly relies on the structural cooperation of the gear portion 11, the pin 12, and the roller 14. Through the coordinated operation of multiple components, this mechanism ensures the safety of the valve coupler during operation. When the valve is in an open state, the pin 12 is pushed by an actuator into an extended position, where it is inserted into a hole of a complementary valve coupler. This mechanically locks the two valve couplers together, preventing relative rotation or disconnection. To separate the valve couplers, it is necessary to first rotate the valve coupler, and only after the valve is fully closed will the pin 12 retract into the hole, thereby releasing the lock and allowing the valve couplers to disconnect.

However, the structural design of the aforementioned valve coupler is relatively complex and bulky. Additionally, since the valve is positioned away from the interface, fluid spillage is likely to occur when the coupler is disconnected, which adversely affects operational convenience and system cleanliness.

In view of this, addressing the aforementioned issues and deficiencies is a critical area of research.

SUMMARY OF THE INVENTION

The present invention provides a fluid coupler with multiple anti-misoperation mechanisms to prevent operational errors. When the fluid coupler is in an undocked state, the elastic force of a spring and the restricting function of a limiting cavity maintain the rear end of the main body portion of a safety pin in a predetermined position, where it abuts against the locking portion of a latch pin. This causes the limiting portion of the latch pin to engage with the limiting groove on the bottom surface of the handle, thereby locking the switch member and preventing unintended opening of the valve before proper docking. When the fluid coupler is docked and positioned with another fluid coupler, the conical portion of the safety pin aligns with and is embedded into the positioning hole of the other fluid coupler. As a result of this engagement, the safety pin is compressed and moves into an unlocked position. In this unlocked position, the locking portion of the latch pin becomes suspended and falls into the safety pin annular groove, thereby causing the limiting portion of the latch pin to disengage from the limiting groove of the handle, thus unlocking the switch member. Furthermore, after the fluid coupler is docked and positioned with another fluid coupler, when the switch member is rotated to the open position, the latch tongue at one end of the fluid coupler passes through the latch tongue slot on its docking platform and is inserted into the latch tongue receptacle of the other fluid coupler, thereby interlocking the two fluid couplers. Through this mechanism, the fluid couplers are prevented from being opened before docking is complete, and they are also prevented from being disconnected after docking while the valve remains open.

An embodiment of the present invention provides a fluid coupler, which includes a body, a support portion, a valve assembly, a switch member, and an interlocking mechanism.

The body has a first end and a second end, with a fluid passage extending therethrough between the first end and the second end. The first end of the body is provided with a docking platform, which has a docking surface. The docking surface is formed with an opening in communication with the fluid passage and is further provided with at least one interlocking latch and at least one latch groove, which are arranged circumferentially around the opening in a staggered manner. An outer periphery of the at least one interlocking latch and the at least one latch groove is further provided with a safety pin hole and a positioning hole. A latch tongue slot and a latch tongue receptacle are also provided between the safety pin hole and the positioning hole, wherein the latch tongue slot is positioned adjacent to the latch tongue receptacle. The support portion is annularly disposed around the first end of the body and is positioned adjacent to a side of the docking platform facing away from the docking surface. The support portion has a first mounting surface and a second mounting surface. The first mounting surface is adjacent to the side of the docking platform facing away from the docking surface and is perpendicular to the docking surface. The second mounting surface is located on a side of the support portion opposite the docking platform and is perpendicular to the first mounting surface. The support portion has a limiting cavity and a latch pin hole formed therein. The limiting cavity extends axially through the support portion between the second mounting surface and the docking surface, and is in communication with the safety pin hole. The latch pin hole opens at the first mounting surface, extends in a direction perpendicular to the first mounting surface, and is in communication with the limiting cavity. The valve assembly includes a valve ball, an upper valve body, and a lower valve stem. The valve ball is pivotally mounted within an internal space of the body via one end of the upper valve body and the lower valve stem. The valve ball has a passage and is rotatable by the upper valve body to transition between a communication state and a blocking state. When the valve ball is in the communication state, the passage aligns with and communicates with the fluid passage. When the valve ball is in the blocking state, the passage is misaligned, thereby blocking the communication with the fluid passage. The switch member is disposed on the first mounting surface of the support portion and includes a handle and a latch tongue. The handle has a pivot connection portion, and the latch tongue is connected to the handle via the pivot connection portion. The pivot connection portion is provided with a shaft hole extending therethrough. The bottom surface of the handle is formed with a limiting groove. The other end of the upper valve body is fixedly disposed within the shaft hole, such that the valve ball rotates in conjunction with the movement of the switch member. The interlocking mechanism includes a safety pin, a spring, and a latch pin. The safety pin includes a main body portion, a front end cylinder, and a conical portion. The main body portion has an outer periphery provided with a safety pin annular groove. The main body portion is received within the limiting cavity, and the front end cylinder extends from the main body portion and is inserted into the safety pin hole. The outer diameter of the main body portion matches the inner diameter of the limiting cavity, while the outer diameter of the front end cylinder is smaller than the outer diameter of the main body portion and matches the inner diameter of the safety pin hole. The conical portion is located at the front end of the safety pin and is capable of protruding beyond the docking surface of the docking platform. The spring is received within the limiting cavity, with one end abutting a bottom wall of the limiting cavity and another end abutting a rear end of the safety pin. The latch pin is movably received within the latch pin hole in a direction perpendicular to an axis of the limiting cavity. The latch pin includes a limiting portion and a locking portion. The limiting portion is disposed at one end of the latch pin and has a shape matching the limiting groove of the handle, allowing the limiting portion to engage with the limiting groove to restrict rotation of the handle. The locking portion is disposed at another end of the latch pin and has a shape matching the safety pin annular groove, such that when the safety pin moves to a specific position, the locking portion is inserted into or disengaged from the safety pin annular groove.

The present invention, through the aforementioned technical solution, ensures that the fluid coupler can only be docked with another fluid coupler in the correct docking orientation by utilizing a pair of interlocking latches and latch grooves of different sizes provided on the docking platform. This design achieves a foolproof function. Additionally, through the coordinated operation of the safety pin, spring, and latch pin within the interlocking mechanism, the switch member can only be unlocked when the fluid coupler is fully docked and positioned with another fluid coupler, causing the safety pin to be compressed and move into an unlocked position where the locking portion of the latch pin becomes suspended and falls into the safety pin annular groove. This effectively prevents the valve from being inadvertently opened before the fluid coupler is fully docked. Furthermore, the handle is provided with a button member, which serves as a secondary protection mechanism for the handle. When the button member is not actuated, the handle remains locked and cannot rotate freely. This prevents unintended valve operation caused by external forces or accidental contact. Additionally, after the fluid coupler is docked with another fluid coupler, when the switch member is rotated to an open position to open the valve, the latch tongue at one end of the fluid coupler passes through the latch tongue slot and is inserted into the latch tongue receptacle of the other fluid coupler, thereby achieving mutual interlocking. This mechanism prevents the fluid couplers from being disconnected while the valve remains open after docking is completed, thereby enhancing operational safety and system stability.

The foregoing description of the present invention, along with the following embodiments, is provided to illustrate and explain the principles of the invention and to further clarify the scope of the patent application.

DETAILED DESCRIPTION OF THE PREFERRED EMBODIMENTS

Figure 1A:
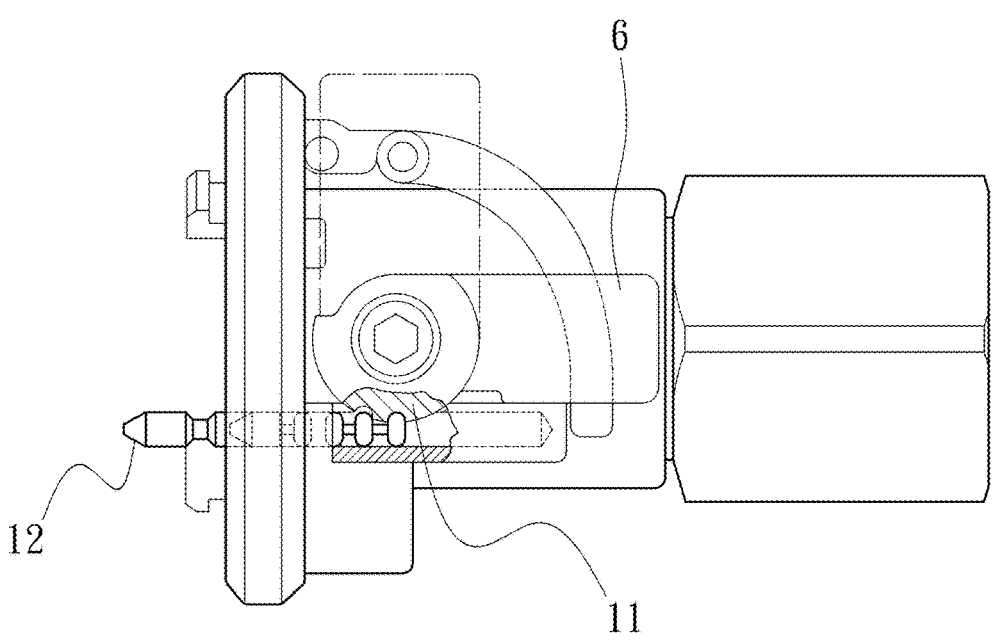
FIG. 1A is a side view schematic of a conventional valve coupler.
Figure 1B:
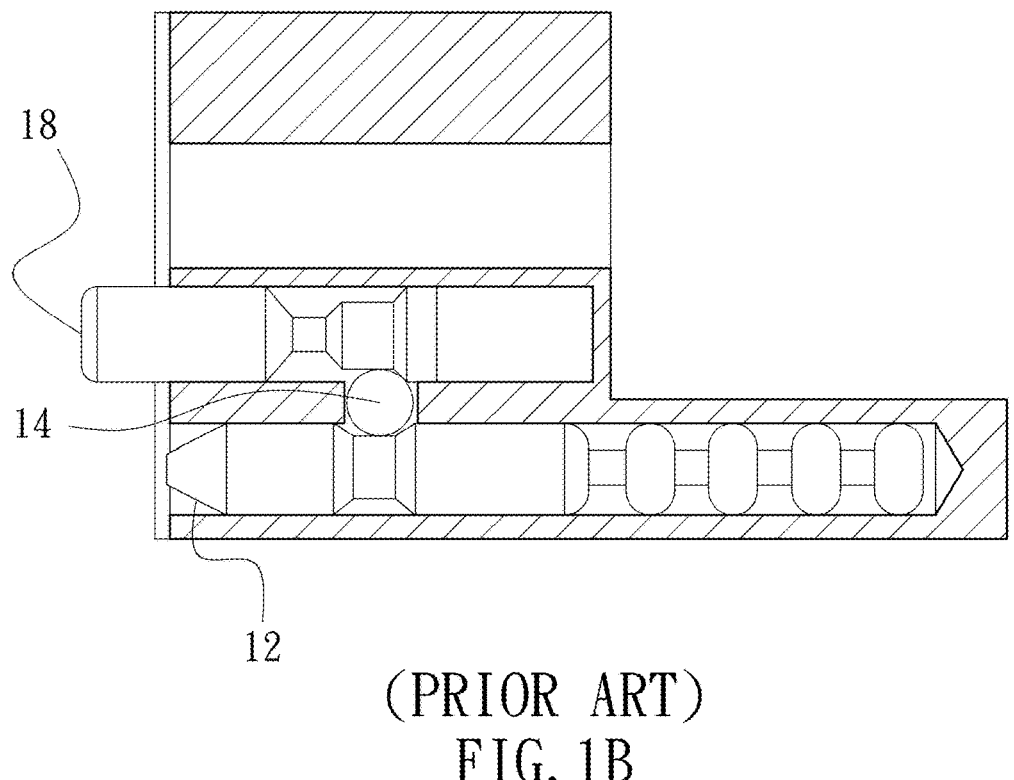
FIG. 1B is a schematic diagram of the interlocking system of the valve coupler shown in FIG. 1A.
Figure 2A:
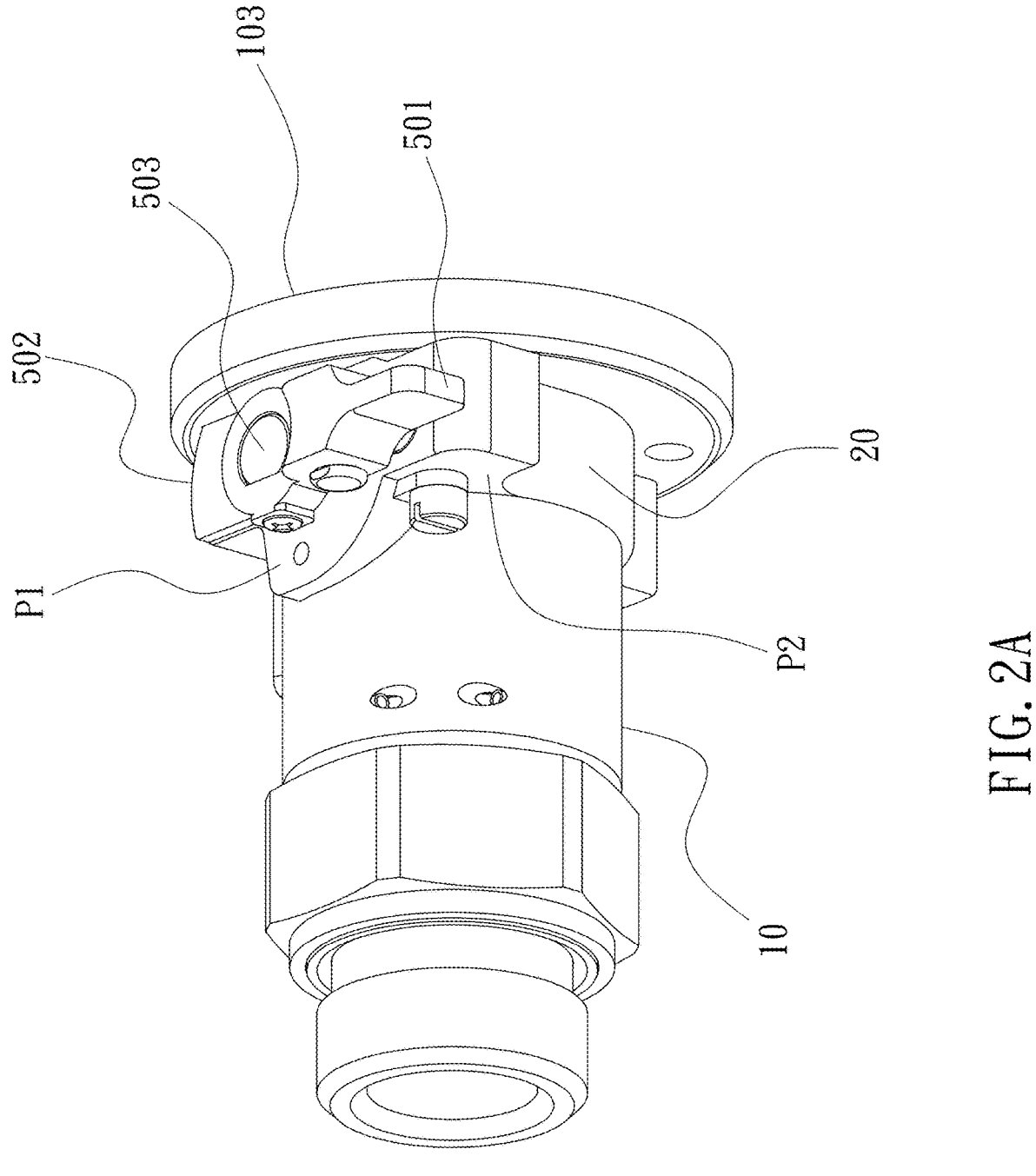
FIG. 2A is a perspective schematic view of a fluid coupler according to an embodiment of the present invention.
Figure 2B:
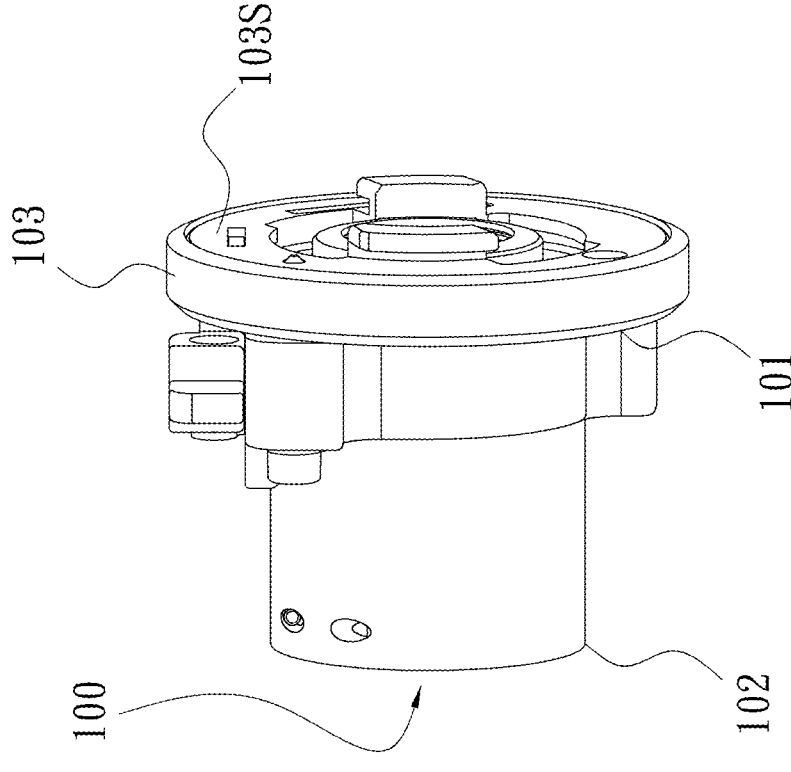
FIG. 2B is a perspective schematic view showing the fluid coupler of FIG. 2A in a separated state from a tube member.
Figure 2B:
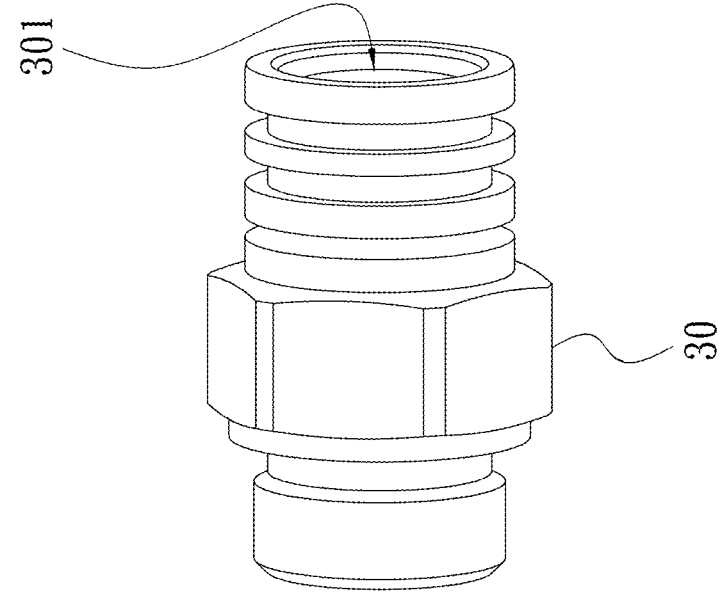
Figure 3:
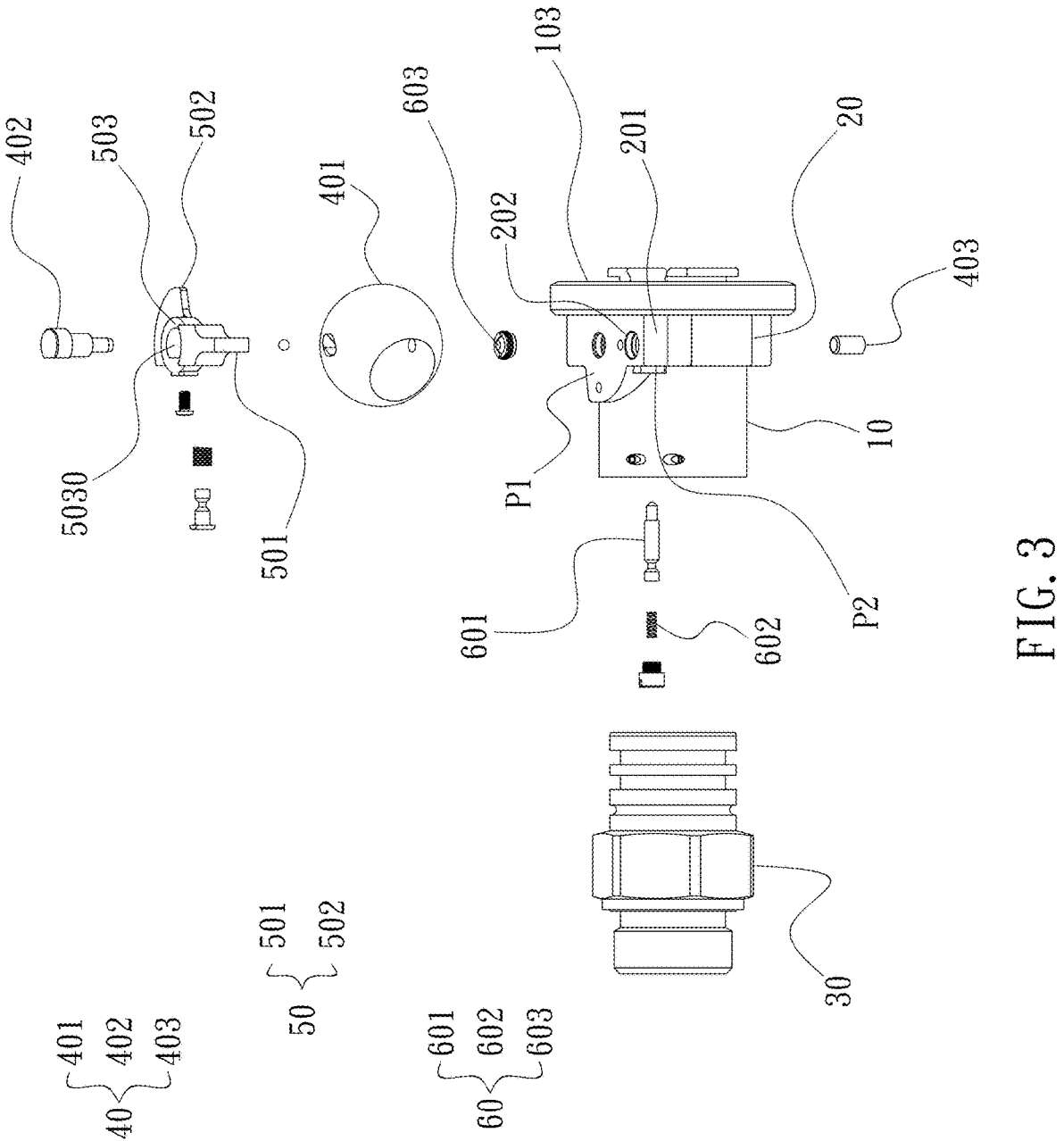
FIG. 3 is an exploded schematic view of the main components of the fluid coupler according to an embodiment of the present invention.

Please refer to FIGS. 2A, 2B, and 3. The fluid coupler 1 of this embodiment is configured for the quick connection or disconnection of two pipeline segments while controlling the flow of fluid. The fluid coupler 1 includes a body 10, a support portion 20, a valve assembly 40, a switch member 50, and an interlocking mechanism 60.

The body 10 has a first end 101 and a second end 102, with a fluid passage 100 extending therethrough between the first end 101 and the second end 102, allowing for fluid conduction and transmission. The first end 101 of the body 10 is provided with a docking platform 103, which is configured to dock with another fluid coupler to establish fluid communication between the fluid passages 100 of the two fluid couplers. The docking platform 103 includes a docking surface 103S, which serves as a structural plane for docking the fluid couplers.

The fluid coupler 1 may further include a tube member 30, which is connected to the second end 102 of the body 10 and has a tube passage 301. The tube passage 301 is in fluid communication with the fluid passage 100 of the body 10. Specifically, the body 10 may be connected to the tube member 30 via a threaded structure at its second end 102 (not shown in the figures), allowing the fluid passage 100 of the body 10 to be in fluid communication with the tube passage 301 of the tube member 30.

Figure 4:
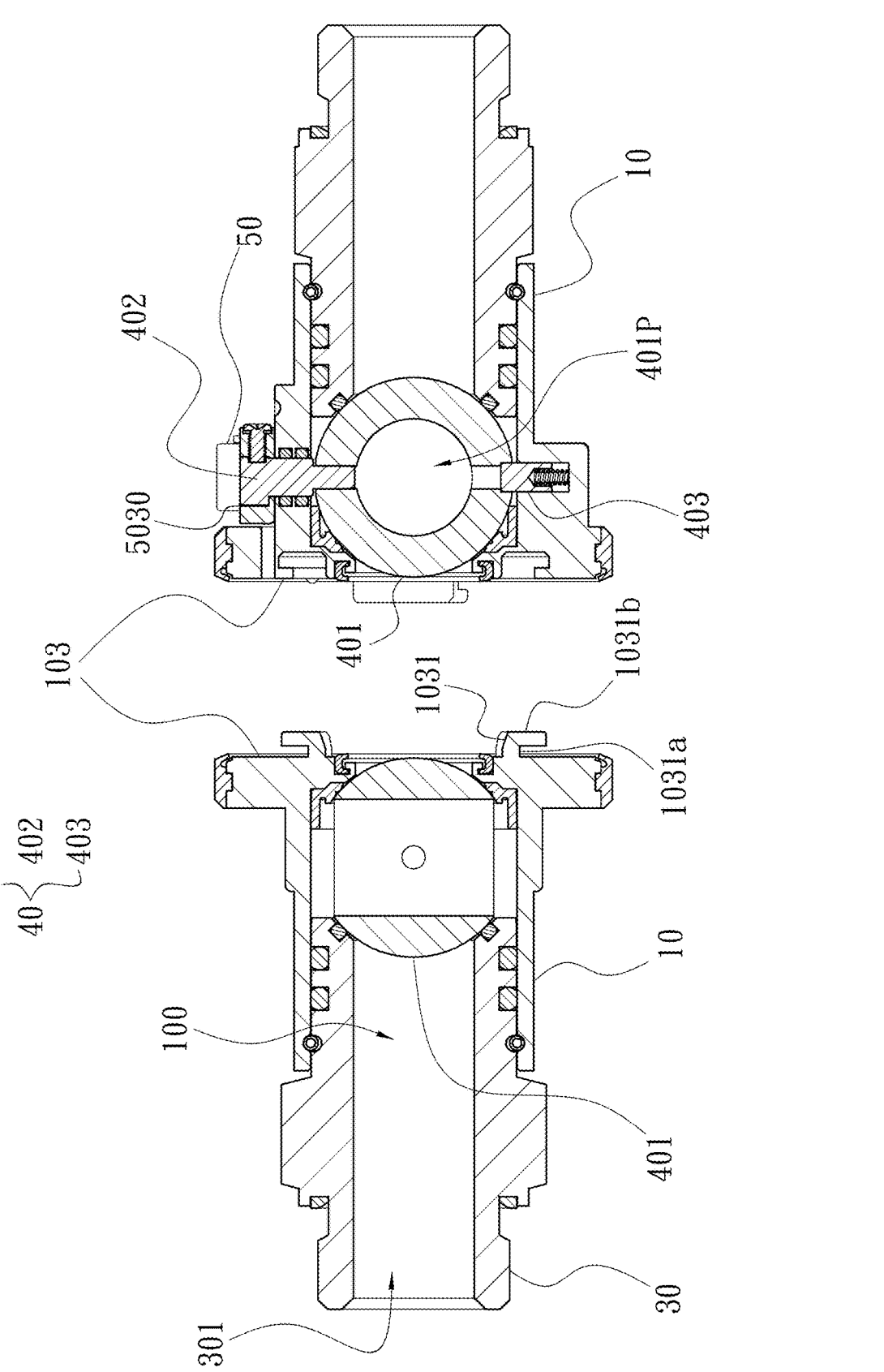
FIG. 4 is a cross-sectional schematic view showing the fluid coupler and another fluid coupler in an undocked state according to an embodiment of the present invention.
Figure 5:
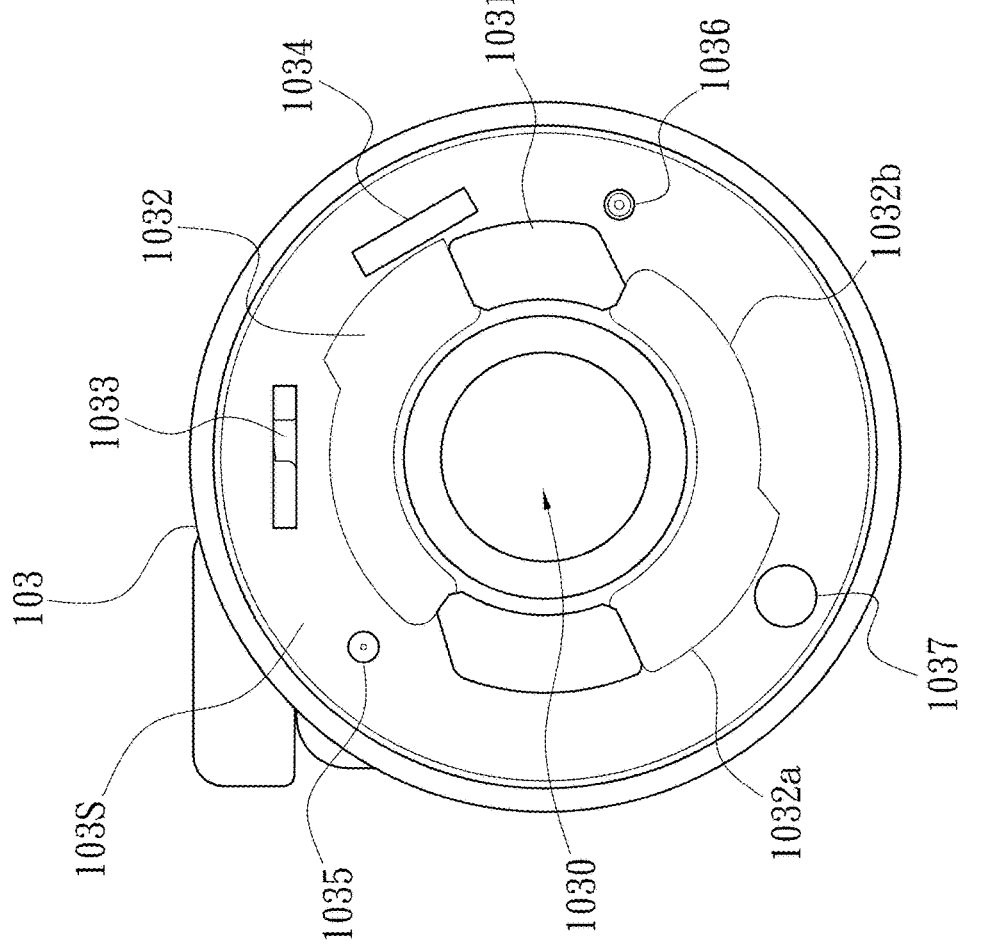
FIG. 5 is a top view schematic of the docking platform structure of the fluid coupler according to an embodiment of the present invention.
Figure 8:
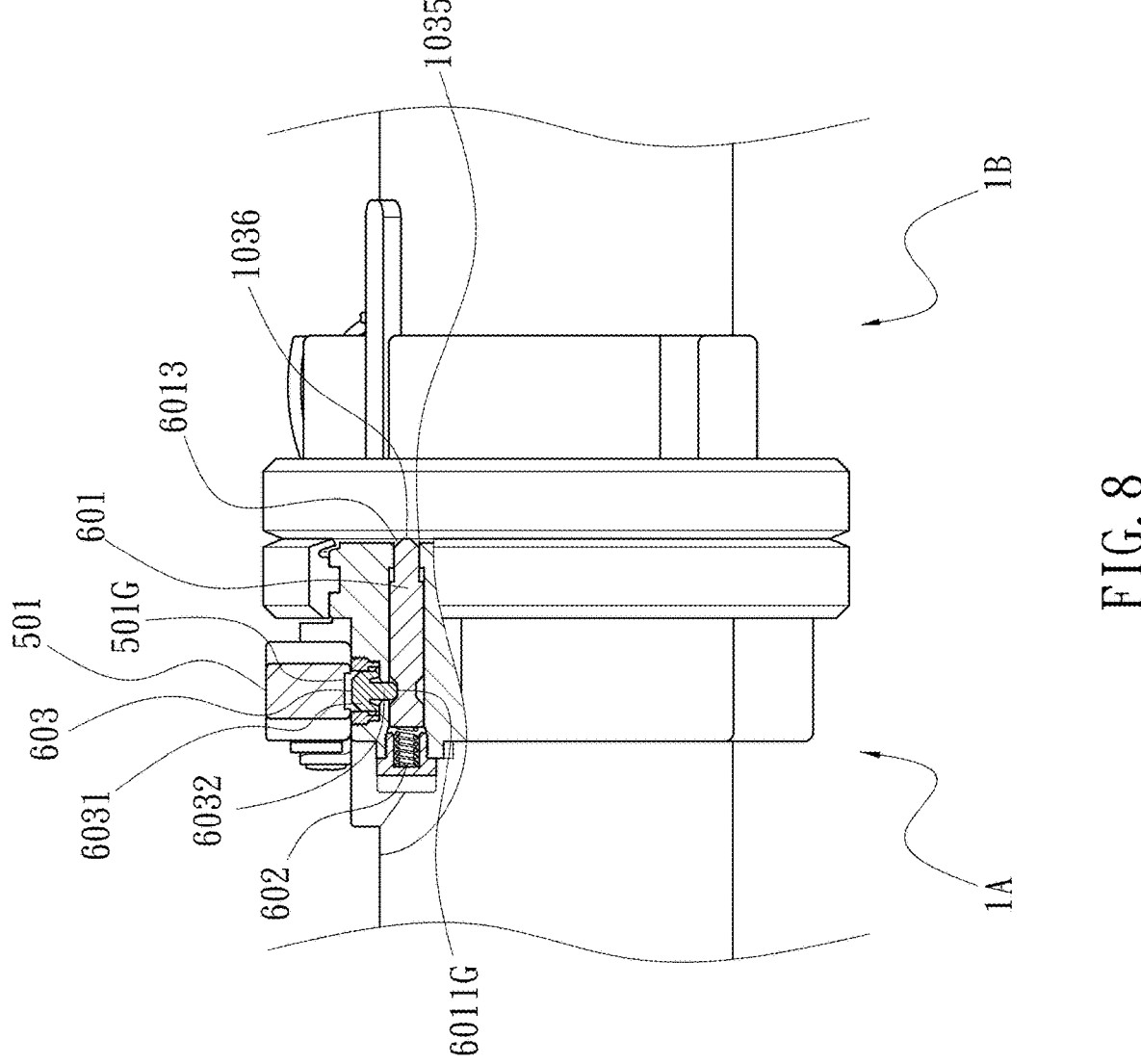
FIG. 8 is a schematic view showing the fluid coupler in an unlocked position after being docked and positioned with another fluid coupler according to an embodiment of the present invention.

Referring to FIGS. 4, 5, and 8, the docking surface 103S of the docking platform 103 is provided with an opening 1030, which is in fluid communication with the fluid passage 100. Additionally, at least one pair of interlocking latches 1031 and at least one pair of latch grooves 1032 are arranged circumferentially in a staggered manner around the opening 1030. The interlocking latches 1031 and latch grooves 1032 form an interlocking structure during docking, allowing the fluid coupler to securely engage during the docking process. This structure prevents misalignment or loosening during docking while ensuring sealing integrity and stability.

The interlocking latch 1031 includes a shank portion 1031a, which extends axially beyond the docking platform 103, and an engagement portion 1031b, which is connected to the shank portion 1031a and disposed perpendicularly to the shank portion 1031a.

The latch groove 1032 includes a docking section 1032a and a locking section 1032b. The docking section 1032a is formed with an opening matching the shape of the engagement portion 1031b, which guides the engagement portion 1031b into the latch groove 1032. The opening of the locking section 1032b is recessed compared to the opening of the docking section 1032a, forming a restricted area. When the engagement portion 1031b of another fluid coupler (not shown) enters the docking section 1032a and rotates to slide into the locking section 1032b, the recessed opening of the locking section 1032b effectively restricts the axial movement of the engagement portion 1031b, ensuring that the two fluid couplers remain in a securely docked state, thereby preventing axial disengagement.

Specifically, the docking platform 103 is provided with a pair of interlocking latches 1031 of different sizes and a pair of latch grooves 1032 of different sizes. As shown in FIG. 5, the interlocking latch 1031 on the left side is larger than the interlocking latch 1031 on the right side, while the latch groove 1032 on the upper side is smaller than the latch groove 1032 on the lower side. Furthermore, the size of each interlocking latch 1031 corresponds to the size of the docking section 1032a of its respective latch groove 1032. This design ensures that the fluid coupler can only be docked with another fluid coupler in the correct docking orientation, thereby achieving a foolproof function to prevent incorrect assembly or unstable connections.

The outer periphery of the interlocking latches 1031 and latch grooves 1032 is provided with a safety pin hole 1035 and a positioning hole 1036. The safety pin hole 1035 is configured to accommodate the front end cylinder 6012 of the safety pin 601. The positioning hole 1036 is designed to align with and receive the conical portion 6013 of the safety pin 601 from the docking platform of another fluid coupler, ensuring precise positioning during the docking process.

A latch tongue slot 1033 and a latch tongue receptacle 1034 are further provided between the safety pin hole 1035 and the positioning hole 1036, arranged adjacent to each other. These structures are designed to engage with the latch tongue structure of another fluid coupler, enabling a locking function during docking. This enhances the stability and security of the fluid coupler during operation.

The docking platform 103 may further be provided with an external lock-through hole 1037. When the fluid coupler is docked with another fluid coupler, the external lock-through holes 1037 of both couplers can align with each other, allowing an additional locking member to be inserted through and secure both fluid couplers simultaneously. This further enhances the stability of the docking connection.

Referring again to FIGS. 2A and 2B, the support portion 20 is annularly disposed around the first end 101 of the body 10 and is positioned adjacent to the side of the docking platform 103 opposite (facing away from) the docking surface 103S. This configuration enhances the structural stability at the connection between the docking platform 103 and the body 10. The support portion 20 includes a first mounting surface P1 and a second mounting surface P2. The first mounting surface P1 is positioned adjacent to the side of the docking platform 103 opposite the docking surface 103S and is perpendicular to the docking surface 103S. The second mounting surface P2 is located on the side of the support portion 20 opposite the docking platform 103 and is perpendicular to the first mounting surface P1.

Figure 6:
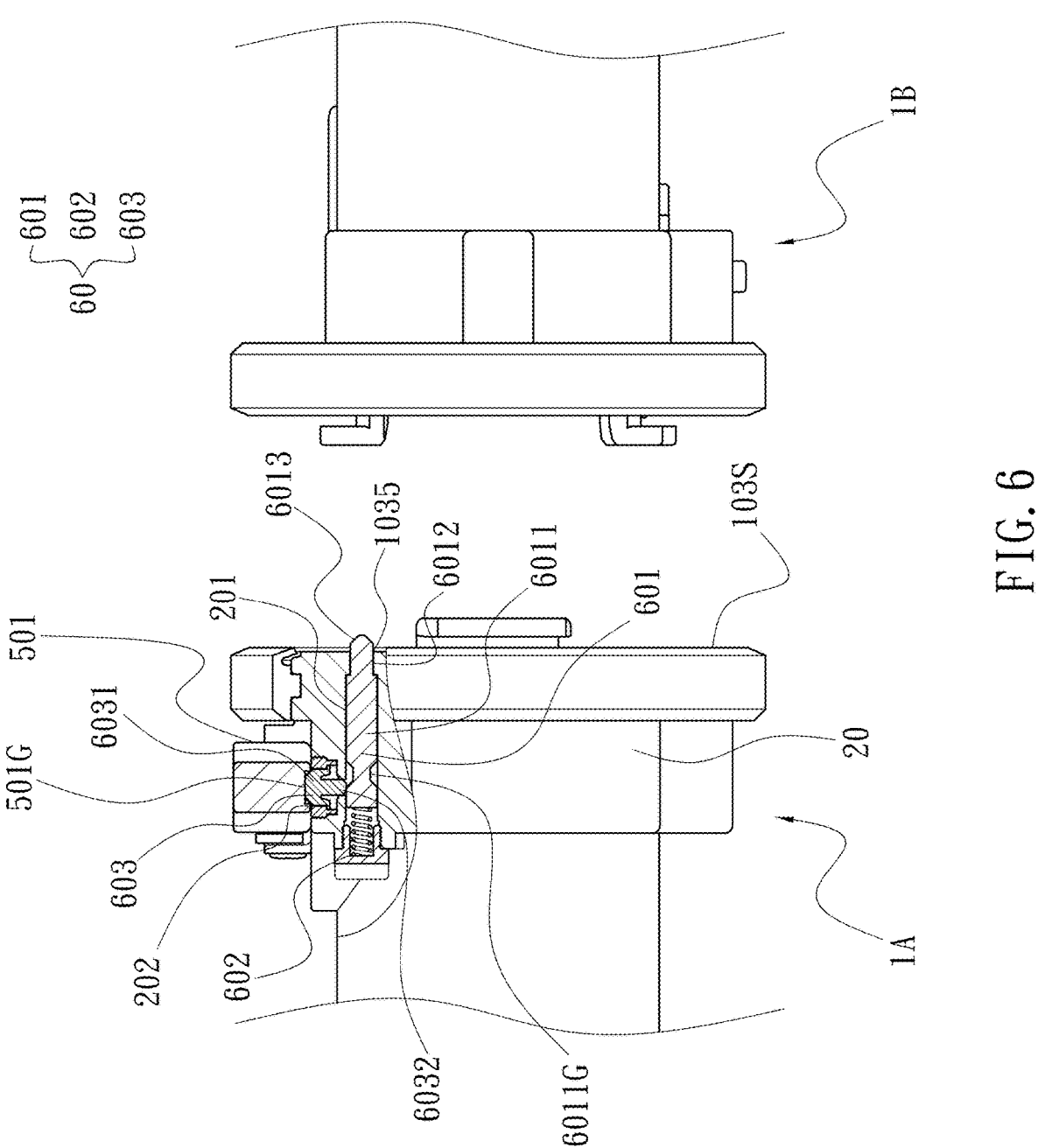
FIG. 6 is a schematic view showing the fluid coupler in an undocked state, with the safety pin positioned in a predetermined position, according to an embodiment of the present invention.

Referring to FIGS. 3 and 6, the support portion 20 is internally provided with a limiting cavity 201 and a latch pin hole 202. The limiting cavity 201 extends axially through the support portion 20, between the second mounting surface P2 and the docking surface 103S, and is in communication with the safety pin hole 1035. The latch pin hole 202 opens at the first mounting surface P1, extends in a direction perpendicular to the first mounting surface P1, and is in communication with the limiting cavity 201.

Referring to FIG. 4, the valve assembly 40 includes a valve ball 401, an upper valve body 402, and a lower valve stem 403. The valve ball 401 is pivotally mounted within the internal space of the body 10 via one end of the upper valve body 402 and the lower valve stem 403. The valve ball 401 is formed with a passage 401P, which can be rotated by the upper valve body 402 between a communication state and a blocking state. When the valve ball 401 rotates to the communication state, the passage 401P aligns with and communicates with the fluid passage 100 (not shown), allowing fluid to flow through. When the valve ball 401 rotates to the blocking state, the passage 401P is misaligned with the fluid passage 100, thereby blocking fluid flow. Additionally, in this embodiment, the components are configured such that the valve ball 401 is positioned closely adjacent to the inner surface of the docking platform 103. This design effectively reduces the space between the two valves when two fluid couplers are docked, significantly minimizing the residual fluid volume between the couplers upon disconnection, thereby enhancing system cleanliness and improving operational efficiency.

One end of the upper valve body 402 is disposed within the shaft hole of the valve ball 401, while the other end of the upper valve body 402 is fixedly disposed within the shaft hole 5030 of the switch member 50. This configuration allows the valve ball 401 to rotate in conjunction with the movement of the switch member 50.

Referring to FIGS. 2A, 3, and 4, the switch member 50 is disposed on the first mounting surface P1 of the support portion 20.

The switch member 50 includes a handle 501 and a latch tongue 502. The latch tongue 502 is positioned at the opposite end of the handle 501. The handle 501 is provided with a pivot connection portion 503, which has a shaft hole 5030 extending therethrough. The latch tongue 502 is connected to the handle 501 via the pivot connection portion 503. When the handle 501 is rotated in one direction to rotate the valve ball 401, aligning the passage 401P of the valve ball 401 with the fluid passage 100 to allow fluid flow, the latch tongue 502 deflects in the opposite direction.

Figure 7:
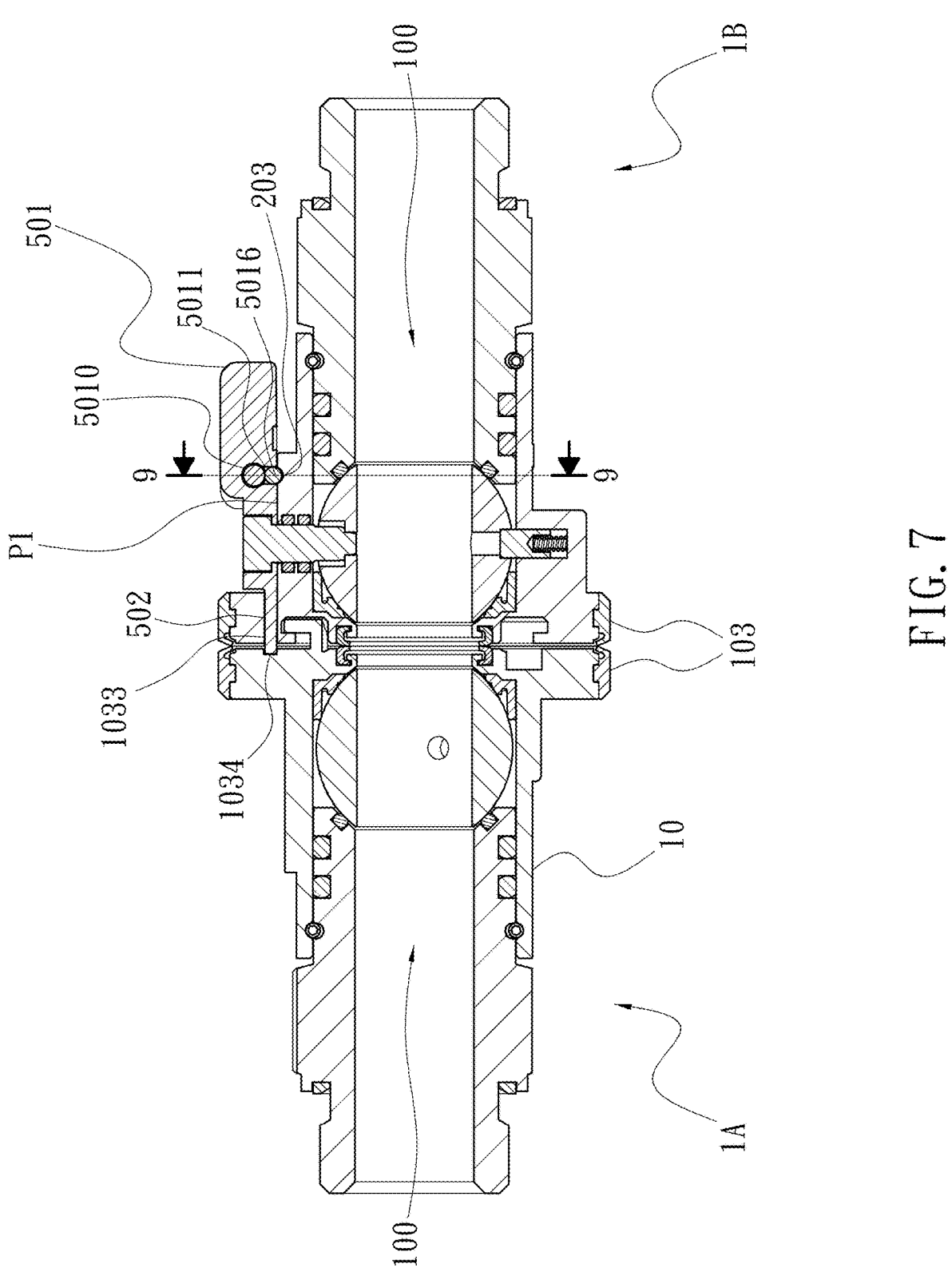
FIG. 7 is a cross-sectional schematic view showing the fluid coupler and another fluid coupler in a docked and positioned state according to an embodiment of the present invention.
Figure 9:
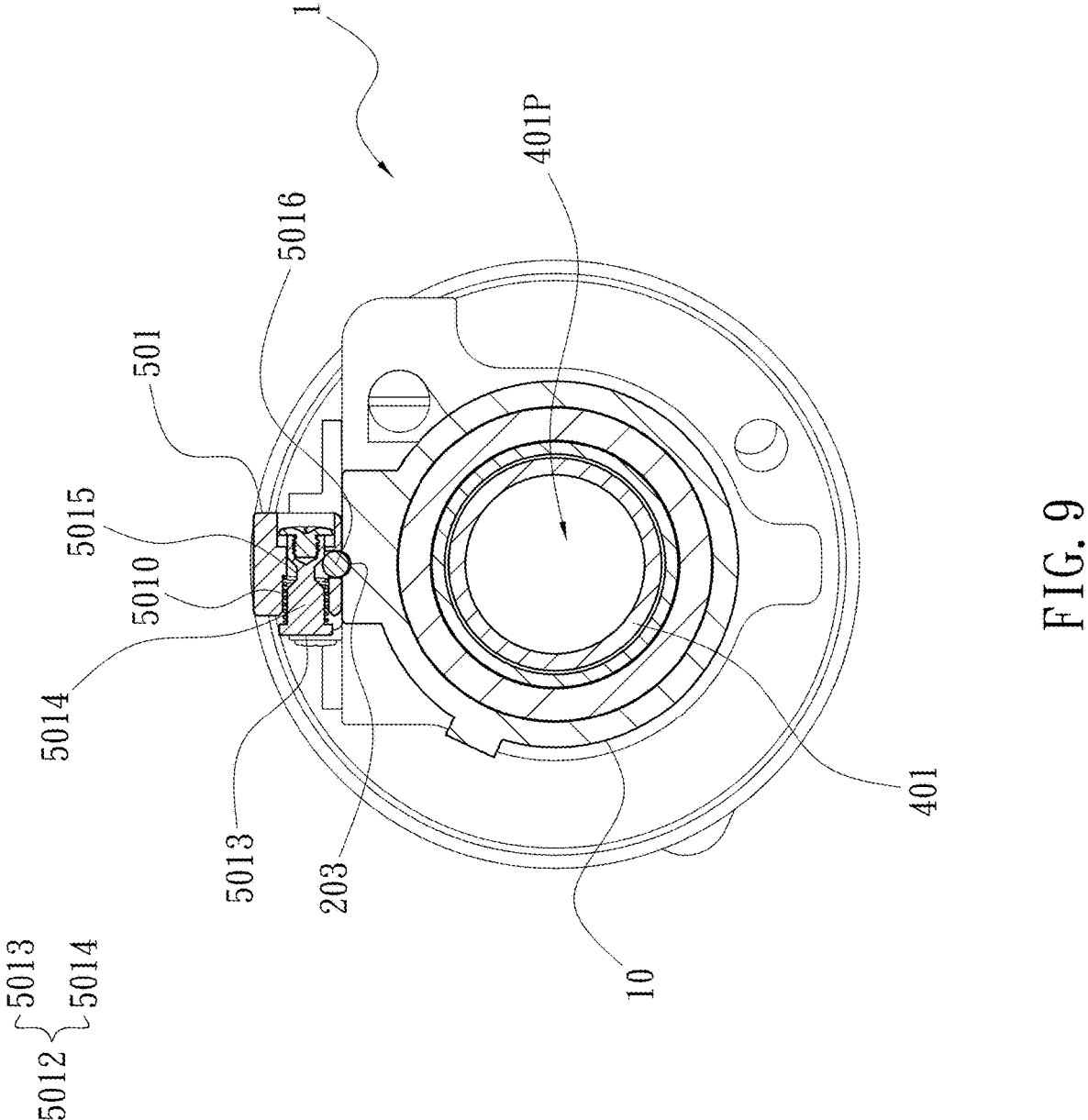
FIG. 9 is a cross-sectional schematic view along section 9-9 of the fluid coupler shown in FIG. 7.

Referring to FIGS. 7 and 9, in this embodiment, the first mounting surface P1 of the support portion 20 is provided with a ball groove 203. The handle 501 is formed with a transversely extending button hole 5010, and a ball through-hole 5011, which is located on the bottom surface of the handle 501 and in communication with the button hole 5010. The ball through-hole 5011 is positioned to correspond with the ball groove 203. A button member 5012 is disposed within the button hole 5010, and is laterally constrained while being capable of limited axial displacement. The button member 5012 includes a pressing portion 5013, which extends out of the button hole 5010, and a pressing core portion 5014, which is positioned within the button hole 5010. The pressing core portion 5014 is circumferentially recessed to form a button annular groove 5015. A ball 5016 is disposed within the ball through-hole 5011. The depth of the ball through-hole 5011 is less than the diameter of the ball 5016, causing the ball 5016 to partially protrude from the bottom surface of the handle 501 and engage with the ball groove 203, thereby forming a secure engagement. In this embodiment, when an external force is applied to the pressing portion 5013, the button member 5012 moves axially, aligning the button annular groove 5015 with the ball through-hole 5011. This alignment allows the ball 5016 to retract upward into the handle 501, thereby disengaging the ball 5016 from the ball groove 203, achieving an unlocking function.

In this embodiment of the present invention, the button member is provided on the handle. When the button member is not pressed, the handle remains in a locked state and cannot rotate freely. This prevents unintended valve operation caused by external forces or accidental contact, thereby further enhancing operational safety and reliability.

Referring to FIG. 6, the interlocking mechanism 60 includes a safety pin 601, a spring 602, and a latch pin 603.

The safety pin 601 includes a main body portion 6011, a front end cylinder 6012, and a conical portion 6013. The outer periphery of the main body portion 6011 is provided with a safety pin annular groove 6011G. The main body portion 6011 is received within the limiting cavity 201, and the front end cylinder 6012 extends from the main body portion 6011, being insertable into the safety pin hole 1035. The outer diameter of the main body portion 6011 matches the inner diameter of the limiting cavity 201, while the outer diameter of the front end cylinder 6012 is smaller than that of the main body portion 6011 and matches the inner diameter of the safety pin hole 1035. The conical portion 6013 is located at the foremost end of the safety pin 601 and is capable of protruding beyond the docking surface of the docking platform 103. In this embodiment, the inner diameter of the safety pin hole 1035 is smaller than the inner diameter of the limiting cavity 201. The front end cylinder 6012 of the safety pin 601 is fitted within the safety pin hole 1035, while the main body portion 6011 is fitted within the limiting cavity 201, ensuring the main body portion 6011 remains securely within the limiting cavity 201, restricting the axial movement of the safety pin 601.

The spring 602 is received within the limiting cavity 201, with one end abutting the bottom wall of the limiting cavity 201 and the other end abutting the rear end of the safety pin 601.

The latch pin 603 is movably received within the latch pin hole 202 in a direction perpendicular to the axis of the limiting cavity 201. The latch pin 603 includes a limiting portion 6031 and a locking portion 6032. The limiting portion 6031 is disposed at one end of the latch pin 603 and has a shape that matches the limiting groove 501G of the handle 501, allowing it to engage with the limiting groove 501G to restrict the rotation of the handle 501. The locking portion 6032 is disposed at the other end of the latch pin 603 and has a shape that matches the safety pin annular groove 6011G. When the safety pin 601 moves to a specific position, the locking portion 6032 can either engage with or disengage from the safety pin annular groove 6011G.

When the fluid coupler 1A and another fluid coupler 1B are in an undocked state, the safety pin 601 remains in a predetermined position. In this predetermined position, the front end of the main body portion 6011 of the safety pin 601 is pushed by the elastic force of the spring 602, causing it to abut against the wall surface inside the limiting cavity 201, adjacent to the safety pin hole 1035. Additionally, the rear end of the main body portion 6011 of the safety pin 601 presses against the locking portion 6032 of the latch pin 603, thereby engaging the limiting portion 6031 of the latch pin 603 with the limiting groove 501G of the handle 501, locking the switch member in place.

As shown in FIG. 6, the locking portion 6032 of the latch pin 603 is positioned against the left side of the safety pin annular groove 6011G. However, the present invention is not limited to this configuration. The locking portion 6032 of the latch pin 603 may also be configured to engage other positions on the main body portion 6011 of the safety pin 601, such as the right side of the safety pin annular groove 6011G. The specific configuration can be adjusted based on practical application requirements, depending on factors such as the length of the safety pin 601 and the placement of the safety pin annular groove 6011G, to accommodate different structural requirements.

Referring to FIGS. 5 and 8, when the interlocking latches 1031 on the docking platform 103 of the fluid coupler 1A and the fluid coupler 1B are correctly engaged within the docking sections 1032a of the corresponding latch grooves 1032, and both fluid couplers are rotated in opposite directions to a predetermined angle (e.g., each fluid coupler rotates counterclockwise by 90 degrees), the docking and positioning process is completed. At this point, the conical portion 6013 of the safety pin 601 of the fluid coupler 1A becomes aligned with and embedded into the positioning hole 1036 on the docking platform 103 of the fluid coupler 1B, thereby reaching the unlocked position.

At this unlocked position, the safety pin 601 moves further in the direction of compressing the spring 602 compared to the predetermined position. This movement causes the locking portion 6032 of the latch pin 603 to become suspended and fall into the safety pin annular groove 6011G. Consequently, the limiting portion 6031 of the latch pin 603 disengages from the limiting groove 501G of the handle 501, thereby releasing the locked state of the handle 501.

As shown in FIG. 8, when the docking surface 103S of the docking platform 103 of the other fluid coupler 1B applies pressure to the safety pin 601, the safety pin 601 moves in the direction of compressing the spring 602. At the moment of docking and positioning, the safety pin 601 precisely reaches the unlocked position. It is important to note that, in this embodiment, the depth of the positioning hole 1036 is matched to the length of the conical portion 6013 of the safety pin 601, allowing it to accommodate only the conical portion 6013. Therefore, during the docking process, the conical portion 6013 of the safety pin 601 of one fluid coupler is first pushed into its limiting cavity 201 by the docking platform of the other fluid coupler. When docking is completed, the conical portion 6013 of the safety pin 601 aligns with and, under the restoring force of the spring 602, slightly protrudes from the limiting cavity 201 to engage within the positioning hole 1036 on the docking platform of the other fluid coupler 1B. At this point, the safety pin 601 precisely reaches the unlocked position, allowing the locking portion 6032 of the latch pin 603 to successfully fall into the safety pin annular groove 6011G, while the limiting portion 6031 of the latch pin 603 disengages from the limiting groove 501G, thereby releasing the locked state of the handle 501.

Referring again to FIG. 7, following the previous embodiment, when the fluid coupler 1A and the other fluid coupler 1B are fully docked and positioned, and the handles 501 of both fluid couplers are rotated in a specific direction to establish fluid communication between the two fluid passages 100, the fluid passages 100 of both fluid couplers become connected. At this stage, the latch tongues 502 of both fluid couplers move in opposite directions, passing through the latch tongue slots 1033 on their respective docking platforms 103, and inserting into the latch tongue receptacles 1034 of the opposite fluid coupler, thereby achieving mutual interlocking. This design effectively prevents disconnection operations while the fluid couplers are docked and positioned but the valve remains open, thereby enhancing operational safety and system stability.

The present invention ensures that the fluid coupler can only be docked with another fluid coupler in the correct docking orientation by providing a pair of interlocking latches and latch grooves of different sizes on the docking platform, thereby achieving a foolproof function. Additionally, through the coordinated operation of the safety pin, spring, latch pin, and limiting cavity within the interlocking mechanism, the switch member can only be unlocked after the fluid coupler is fully docked and positioned. Specifically, the safety pin moves under compression and causes the locking portion of the latch pin to become suspended and fall into the safety pin annular groove, thereby releasing the lock on the switch member. This prevents the valve from being inadvertently opened before docking is complete. Furthermore, the button member on the handle serves as a secondary safety protection mechanism. When the button member is not pressed, the handle remains locked and cannot rotate, preventing unintended valve operation due to external forces or accidental contact. Additionally, after two fluid couplers are docked and the valve is opened, the latch tongue passes through the latch tongue slot on the docking platform and is inserted into the latch tongue receptacle of the other fluid coupler, thereby achieving mutual interlocking. This mechanism prevents disconnection operations while the valve remains open, further enhancing operational safety and system stability. The interlocking mechanism, primarily composed of a safety pin, spring, and latch pin, simplifies the design by eliminating the need for gears or other complex components, thereby reducing the size of the components. Moreover, by optimizing the configuration of components, the valve ball can be positioned closely adjacent to the inner surface of the docking platform, effectively reducing fluid spillage when the fluid couplers are disconnected, thereby improving system cleanliness and operational efficiency.

The foregoing provides a detailed description of the present invention; however, the embodiments described above are merely preferred examples and should not be construed as limiting the scope of implementation of the present invention. Any equivalent modifications and variations made in accordance with the scope of the patent claims should still fall within the patent protection scope of the present invention.

What is claimed is:

1. A fluid coupler, comprising:

a body having a first end and a second end, with a fluid passage extending through the body between the first end and the second end, the first end of the body being provided with a docking platform having a docking surface, the docking surface having an opening in communication with the fluid passage and provided with at least one interlocking latch and at least one latch groove arranged circumferentially around the opening in a staggered manner, wherein an outer periphery of the at least one interlocking latch and the at least one latch groove is provided with a safety pin hole and a positioning hole, a latch tongue slot and a latch tongue receptacle are further provided between the safety pin hole and the positioning hole, and the latch tongue slot is arranged adjacent to the latch tongue receptacle;

a support portion annularly disposed around the first end of the body and positioned adjacent to a side of the docking platform facing away from the docking surface, the support portion having a first mounting surface and a second mounting surface, the first mounting surface being adjacent to the side of the docking platform facing away from the docking surface and perpendicular to the docking surface of the docking platform, the second mounting surface being located on a side of the support portion facing away from the docking platform and perpendicular to the first mounting surface, the support portion having a limiting cavity and a latch pin hole therein, wherein the limiting cavity extends axially through the support portion between the second mounting surface and the docking surface and is in communication with the safety pin hole, and the latch pin hole opens at the first mounting surface, extends in a direction perpendicular to the first mounting surface, and is in communication with the limiting cavity;

a valve assembly comprising a valve ball, an upper valve body, and a lower valve stem, wherein the valve ball is pivotally mounted within an internal space of the body via one end of the upper valve body and the lower valve stem, the valve ball having a passage and configured to be driven to rotate by the upper valve body;

a switch member disposed on the first mounting surface of the support portion, the switch member comprising a handle and a latch tongue, the handle having a pivot connection portion, the latch tongue being connected to the handle via the pivot connection portion, the pivot connection portion being provided with a shaft hole therethrough, the handle having a bottom surface defined with a limiting groove, wherein the upper valve body has another end fixedly disposed within the shaft hole, enabling the valve ball to rotate in conjunction with the rotation of the switch member; and an interlocking mechanism comprising a safety pin, a
spring, and a latch pin, the safety pin comprising a main
body portion, a front end cylinder, and a conical
portion, the main body portion having an outer periph-
ery provided with a safety pin annular groove, the main
body portion being received within the limiting cavity,
the front end cylinder extending from the main body
portion and being inserted into the safety pin hole, the
main body portion having an outer diameter matching
an inner diameter of the limiting cavity, the front end
cylinder having an outer diameter smaller than the
outer diameter of the main body portion and matching
an inner diameter of the safety pin hole, the conical
portion being located at a front end of the safety pin and
capable of protruding beyond the docking surface of
the docking platform, the spring being received within
the limiting cavity with one end abutting a bottom wall
of the limiting cavity and another end abutting a rear
end of the safety pin, wherein the latch pin is movably
received within the latch pin hole in a direction per-
pendicular to an axis of the limiting cavity, the latch pin
comprising a limiting portion and a locking portion, the
limiting portion being disposed at one end of the latch
pin and having a shape matching the limiting groove of
the handle, and the locking portion being disposed at
another end of the latch pin and having a shape match-
ing the safety pin annular groove.

2. The fluid coupler of claim 1, further comprising a tube
member, the tube member being connected to the second end
of the body and having a tube passage, the tube passage
being in communication with the fluid passage.

3. The fluid coupler of claim 1, wherein the interlocking
latch comprises a shank portion protruding from the docking
platform and an engagement portion connected to the shank
portion and disposed perpendicularly to the shank portion,
the latch groove comprises a docking section and a locking
section, the docking section having an opening matching the
shape of the engagement portion, the locking section having
an opening that is recessed compared to the opening of the
docking section, and when the engagement portion slides
into the locking section, the opening of the locking section
is capable of restricting axial separation of the engagement
portion.

4. The fluid coupler of claim 1, wherein the docking
platform is provided with a pair of interlocking latches of
different sizes and a pair of latch grooves of different sizes,
and the size of each interlocking latch matches the size of the
docking section of its corresponding latch groove.

5. The fluid coupler of claim 1, wherein a depth of the
positioning hole matches a length of the conical portion of
the safety pin.

6. The fluid coupler of claim 1, wherein the second
mounting surface of the support portion is further provided
with a ball groove, the handle is further provided with a
button hole extending transversely therethrough and a ball
through-hole located on a bottom surface of the handle, the
ball through-hole is in communication with the button hole,
and the position of the ball through-hole corresponds to the
ball groove.

7. The fluid coupler of claim 6, wherein the button hole is
provided with a button member that is laterally constrained
and capable of limited axial displacement, the button mem-
ber comprising a pressing portion extending out of the
button hole and a pressing core portion disposed within the
button hole, the pressing core portion having a button
annular groove recessed on its outer periphery.

8. The fluid coupler of claim 1, wherein when the fluid
coupler is in an undocked state, the safety pin is maintained
in a predetermined position, in which a front end of the main
body portion of the safety pin, under a force of the spring,
abuts against a wall surface within the limiting cavity
adjacent to the safety pin hole, and a rear end of the main
body portion of the safety pin presses against the locking
portion of the latch pin, causing the limiting portion of the
latch pin to engage with the limiting groove of the handle to
lock the switch member.

9. The fluid coupler of claim 8, wherein when the fluid
coupler is docked and positioned with another fluid coupler,
the conical portion of the safety pin aligns with and is
embedded into the positioning hole on the docking platform
of the other fluid coupler to reach an unlocked position, in
which the safety pin, compared to the predetermined posi-
tion, further moves in a direction compressing the spring,
causing the locking portion of the latch pin to be suspended
and fall into the safety pin annular groove.

10. The fluid coupler of claim 9, wherein after the fluid
coupler is docked and positioned with another fluid coupler,
when the switch member is rotated in a direction to rotate the
valve ball, the latch tongue passes through the latch tongue
slot in an opposite direction and is inserted into the latch
tongue receptacle of the other fluid coupler, causing the fluid
coupler and the other fluid coupler to engage with each
other.

* * * * *